(12) United States Patent
Cho et al.

(10) Patent No.: US 9,166,761 B2
(45) Date of Patent: Oct. 20, 2015

(54) METHOD AND APPARATUS FOR ALLOCATING RESOURCES IN WIRELESS COMMUNICATION SYSTEM

(71) Applicant: LG ELECTRONICS INC., Seoul (KR)

(72) Inventors: Hee Jeong Cho, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/354,371

(22) PCT Filed: Oct. 23, 2012

(86) PCT No.: PCT/KR2012/008695
§ 371 (c)(1),
(2) Date: Apr. 25, 2014

(87) PCT Pub. No.: WO2013/062278
PCT Pub. Date: May 2, 2013

(65) Prior Publication Data
US 2014/0269626 A1    Sep. 18, 2014

Related U.S. Application Data

(60) Provisional application No. 61/551,930, filed on Oct. 27, 2011.

(51) Int. Cl.
*H04L 1/18* (2006.01)
*H04L 5/00* (2006.01)
(Continued)

(52) U.S. Cl.
CPC ............ *H04L 5/0055* (2013.01); *H04L 1/1685* (2013.01); *H04L 1/1893* (2013.01); *H04W 72/04* (2013.01); *H04W 74/006* (2013.01); *H04L 1/1614* (2013.01); *H04L 1/1861* (2013.01)

(58) Field of Classification Search
CPC ... H04L 5/0055; H04L 1/1607; H04L 1/1614; H04L 1/1861; H04L 1/1809; H04L 1/1685; H04L 5/02; H04L 27/2602; H04L 1/1893; H04W 56/0045; H04W 36/0055; H04W 74/006; H04W 28/04; H04W 74/0833; H04W 72/04; H04W 74/0866; H04W 74/004; H03M 13/6544; H03M 13/09
USPC ................. 370/216, 252, 328, 329, 330, 335; 455/466, 525; 714/748–751
See application file for complete search history.

(56) References Cited

U.S. PATENT DOCUMENTS

2008/0209301 A1 * 8/2008 Chang et al. .................. 714/749
2008/0232330 A1 * 9/2008 Lee et al. ...................... 370/335
(Continued)

FOREIGN PATENT DOCUMENTS

KR     1020100092398 A      8/2010
KR     WO 2010/117206    * 10/2010    ............ H04W 74/08
(Continued)

OTHER PUBLICATIONS

IEEE Std 802.16m "IEEE Standard for Local and metropolitan area networks—Part 16: Air Interface Broadband Wireless Access Systems Amendment 3: Advanced Air Interface", Jun. 2011, 1106 Pages.*

(Continued)

*Primary Examiner* — Edan Orgad
*Assistant Examiner* — Ivan O Latorre
(74) *Attorney, Agent, or Firm* — Dentons US LLP (57) ABSTRACT

The present invention relates to a method and apparatus for transmitting a bandwidth request (BR) header in a wireless communication system. User equipment transmits a standalone BR header to a base station through a first uplink (UL) resource allocated by a BR-acknowledgement (ACK) A-MAP information element (IE), receives from the base station a hybrid automatic repeat request (HARQ)-non-acknowledgement (NACK) which indicates the base station has not successfully received the standalone BR header, receives a CDMA allocation A-MAP IE from the base station, and retransmits the standalone BR header through a second UL resource allocated by the CDMA allocation A-MAP IE.

12 Claims, 7 Drawing Sheets

(51) Int. Cl.
H04W 74/00 (2009.01)
H04W 72/04 (2009.01)
H04L 1/16 (2006.01)

(56) References Cited

U.S. PATENT DOCUMENTS

| | | | |
|---|---|---|---|
| 2010/0251083 A1* | 9/2010 | Cho et al. | 714/807 |
| 2010/0260128 A1* | 10/2010 | Cho et al. | 370/329 |
| 2011/0013717 A1* | 1/2011 | Josiam et al. | 375/295 |
| 2011/0093757 A1* | 4/2011 | Seol et al. | 714/749 |
| 2011/0164515 A1* | 7/2011 | Park et al. | 370/252 |
| 2011/0280172 A1* | 11/2011 | Cohen et al. | 370/312 |

FOREIGN PATENT DOCUMENTS

| | | |
|---|---|---|
| KR | 1020100135650 A | 12/2010 |
| KR | 1020110006597 A | 1/2011 |
| KR | 1020110088432 A | 8/2011 |

OTHER PUBLICATIONS

Sassan Ahmadi, Mobile WiMAX: A System Approach to Understanding IEE 802.16m Radio Access Technology, 1st Edition, Academic Press, 2010—pp. 524-527.*

Hyunkyu et al., "Clarification on BR-ACK A-MAP IE (Section 16.3.5.5)", Nov. 2010, IEEE 802.16 Broadband Wireless ACcess Working Group, IEEE C802.16m-10/1318r6, 4 Pages.*

Cho et al., "Proposed text for clarfications of Contention-based random access bandwidth request (D7-16.2.11.1.1)", Aug. 2010, IEEE 802.16 Broadband Wireless Access Working Group, IEEE C802.16m-10/1004, 4 pages.*

Chou et al., "Harmonization Text Proposal on BR-ACK A-MAP IE", Mar. 2010, IEEE 802.16 Broadband Wireless Access Working Group, IEEE C802.16m-10/0450, 3 pages.*

Hyunkyu et al., "Clarification on BR-ACK A-MAP IE (Section 16.3.5.5)", Nov. 2010, IEEE 802..16 Broadband Wireless Access Working Group, IEEE C802.16m-10/1318r1, 3 Pages.*

* cited by examiner

METHOD AND APPARATUS FOR ALLOCATING RESOURCES IN WIRELESS COMMUNICATION SYSTEM

This application is a National Stage entry of International Application No. PCT/KR2012/008695, filed on Oct. 23, 2012, which claims priority to U.S. Provisional Application No. 61/551,930 filed Oct. 27, 2011, both of which are incorporated by reference herein in their entirety.

BACKGROUND OF THE INVENTION

1. Field of the Invention

The present invention relates to wireless communications, and more particularly, to a method and apparatus for allocating resources in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A user equipment may request radio resources for transmitting uplink data or control signal. This may be called a bandwidth request (BR) process. The user equipment transmits a BR header to a base station through a UL resource allocated by the base station to request a bandwidth.

A hybrid automatic repeat request (HARQ) may be used even for the BR header. That is, when the base station successfully receives the BR header transmitted by the user equipment, the base station transmits an acknowledgement (ACK) for the BR header to the user equipment to notify that the base station successfully receives the BR header. When the base station does not successfully receive the BR header transmitted by the user equipment, the base station transmits a non-acknowledgement (NACK) for the BR header to the user equipment to notify that the base station does not successfully receive the BR header. The user equipment that receives the NACK may retransmit the BR header to the base station. The HARQ may be divided into an adaptive HARQ and a non-adaptive HARQ.

When the BR header is retransmitted according to the HARQ, a method for efficiently allocating the UL resource for the BR header is required.

SUMMARY OF THE INVENTION

The present invention provides a method and an apparatus for allocating resources in a wireless communication system. The present invention provide a method for using adaptive hybrid automatic repeat request (HARQ) retransmission for transmission of a bandwidth request (BR) header during a bandwidth request process in a wireless communication system.

In an aspect, a method for transmitting, by a user equipment (UE), a bandwidth request (BR) header in a wireless communication system is provided. The method includes transmitting a standalone BR header to a base station through a first uplink (UL) resource allocated through a BR-acknowledgement (ACK) A-MAP information element (IE), receiving from the base station a hybrid automatic repeat request (HARQ)-non-acknowledgement (NACK) that indicates that the standalone BR header is not successfully received by the base station, receiving a CDMA allocation A-MAP IE from the base station, and retransmitting the standalone BR header to the base station through a second UL resource allocated through the CDMA allocation A-MAP IE.

In another aspect, a user equipment (UE) for transmitting a bandwidth request (BR) header in a wireless communication system is provided. The UE includes a radio frequency (RF) unit for transmitting or receiving a radio signal, and a processor connected with the RF unit, and configure to transmit a standalone BR header to a base station through a first uplink (UL) resource allocated through a BR-acknowledgement (ACK) A-MAP information element (IE), receive from the base station a hybrid automatic repeat request (HARQ)-non-acknowledgement (NACK) that indicates that the standalone BR header is not successfully received by the base station, receive a CDMA allocation A-MAP IE from the base station, and retransmit the standalone BR header to the base station through a second UL resource allocated through the CDMA allocation A-MAP IE.

A burden that a scheduler of a UE should reserve an uplink (UL) resource can be reduced.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
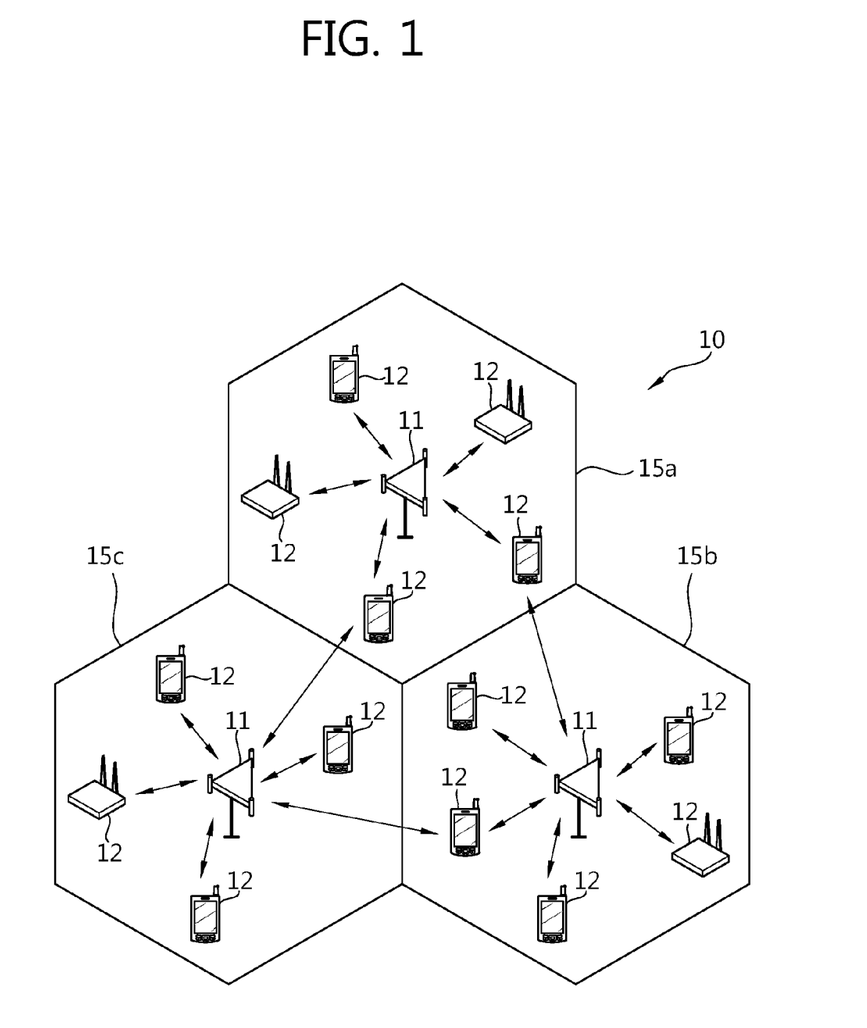
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
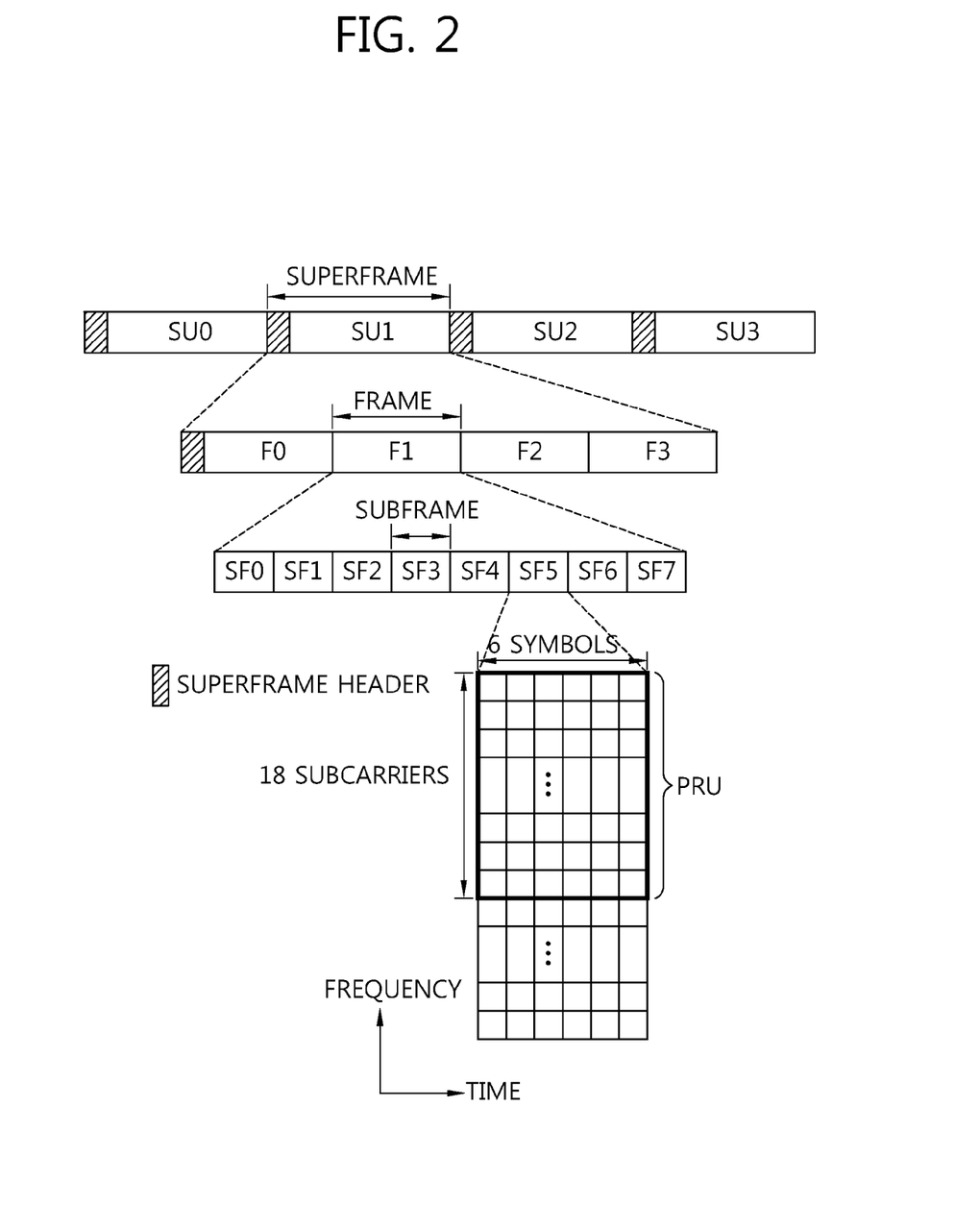
FIG. 2 shows an example of an IEEE 802.16m frame structure.

FIG. 2 shows an example of an IEEE 802.16m frame structure.

Referring to FIG. 2, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.16e frame structure of FIG. 4.

TABLE 1

| | | | | | | |
|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time(μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G \cdot T_b$, an OFDMA symbol time $T_s$ is $T_b + T_g$, and a sampling time is $T_b/N_{FFT}$.

Hereinafter, a bandwidth request channel (BRCH) is described.

The BRCH is a channel to request radio resources for transmitting uplink data or a control signal to be transmitted by a UE. Bandwidth request information may be transmitted on the BRCH by using contention based random access. The BRCH includes resources for the UE to transmit a BR preamble and an additional quick access message. The BRCH may be configured by a BR tile.

Figure 3:
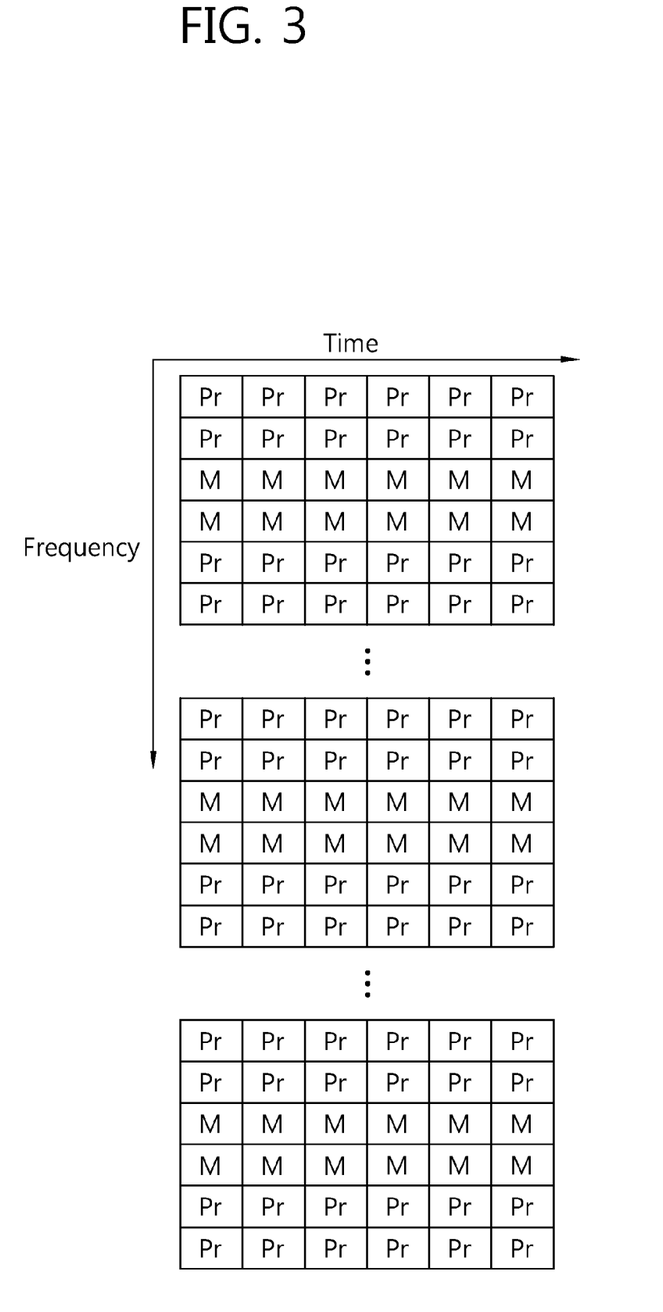
FIG. 3 shows an example of structure of a BR tile.

FIG. 3 shows an example of structure of a BR tile.

Referring to FIG. 3, the BR tile may be defined by 6 consecutive subcarriers and 6 OFDMA symbols. Each BRCH includes 3 distributed BR tiles for frequency diversity. The BR tile is constituted by a preamble part Pr and a data part M. The preamble part may transmit the BR preamble on resources constituted by 6 OFDMA symbols and 4 subcarriers. The data part may transmit a quick access message on resources constituted by 6 OFDMA symbols and 2 consecutive subcarriers. In the BRCH, each BR tile may carry a part of the same preamble quick access message. The UE may transmit only the BR preamble and may remain the resources for the quick access message. The UE may determine whether to transmit only the BR preamble or both the BR preamble and the quick access message.

The UE may perform a contention based BR by using the BR preamble and the additional quick access message transmitted on the BRCH or a standalone BR transmitted through a BR signaling header, etc. Each BRCH may indicate one BR opportunity. The BR may be generally performed through a process of three steps or five steps. The 3-step BR process is used for performing a more rapid BR and the 5-step BR process is used for more stably performing the contention based BR process. The BS or the UE may determine which BR process the BR is to be performed through.

Figure 4:
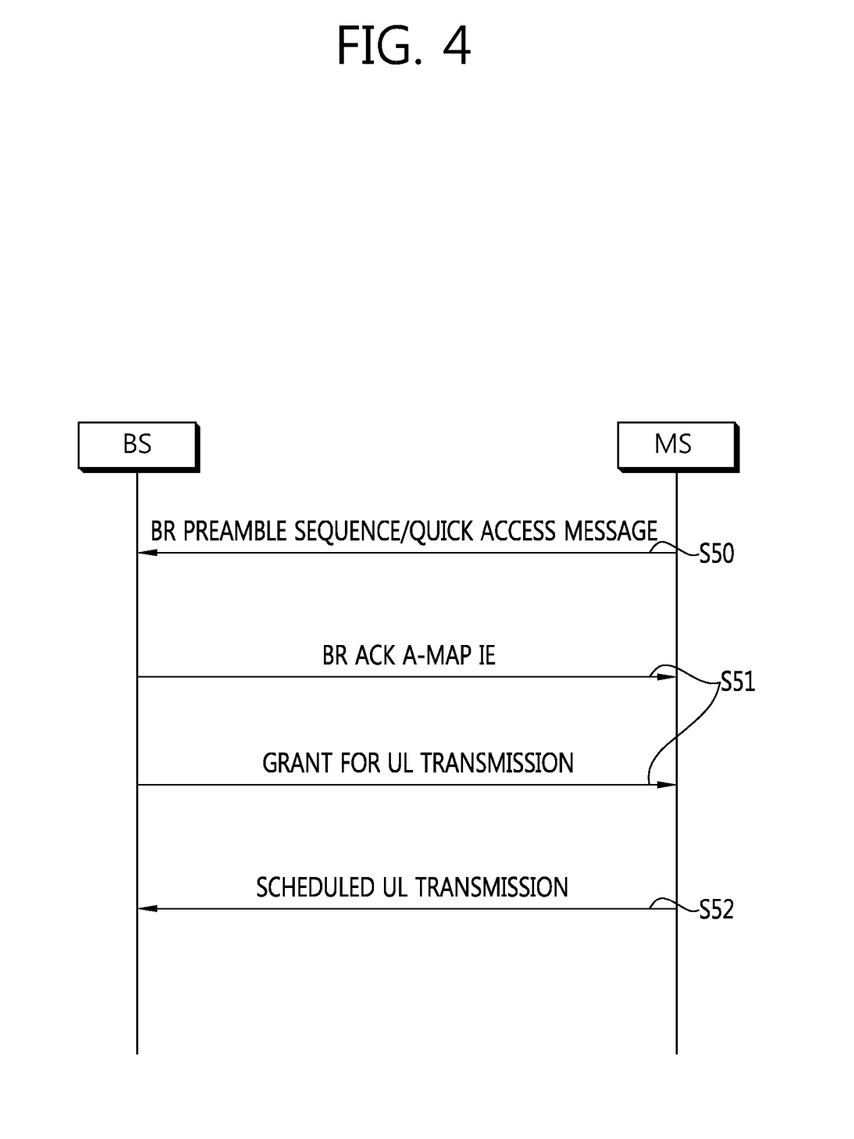
FIG. 4 shows an example of a 3-step BR process.

FIG. 4 shows an example of a 3-step BR process.

In step S50, the UE transmits a BR preamble sequence and a quick access message to the BS on a randomly selected BRCH. The quick access message carries 12-bit information including address information of the UE and additional 4-bit BR information.

In step S51, the BS transmits a grant for UL transmission to the UE. In this case, the BS may transmit acknowledgement (ACK) that means the BS receives the BR preamble sequence or the quick access message together. In transmitting the ACK, if the BS detects at least one BR preamble sequence in the BR opportunities of frame n, and the BS does not grant UL resources by the CDMA_Allocation_IE, the UL subband assignment A-MAP IE, or the UL basic assignment IE to all the successfully received BR requests before or in the frame n+BR_ACK_Offset, at least one BR-ACK A-MAP IE shall be sent at the DL frame of the frame n+BR_ACK_Offset. Further, the ABS may send multiple BR-ACK A-MAP IEs in the subframes in the DL frame of frame n+BR_ACK_Offset, with each BR-ACK A-MAP IE containing its own bitmap relating to the preamble sequences being acknowledged/granted in this A-MAP IE alone. Each UE should try to decode all BR-ACK MAP-IEs at the DL frame of frame n+BR_ACK_Offset after it transmitted a BR preamble sequence. In this case if no BR-ACK A-MAP IEs are sent at the DL frame of frame n+BR_ACK_Offset and the UE does not receive any UL grant before or in frame n+BR_ACK_Offset, the UE considers it as an implicit negative ACK (NACK) and may restart BR process.

Table 2 shows an example of the BR-ACK A-MAP IE.

correctly received BR preamble sequences in the BR opportunities of the n-th frame. Further, the BR-ACK A-MAP IE indicates a decoding status of the quick access message for each correctly received BR preamble sequence.

TABLE 2

| Field | Size (bits) | Notes |
|---|---|---|
| BR-ACK_A-MAP_IE( ){ | | |
|   A-MAP IE Type | 4 | BR-ACK A-MAP IE |
|   BR-ACK Bitmap | N_BR_Opportunities | Each bit indicates whether this BR-ACK A-MAP IE includes the decoding status of the BR preamble in the corresponding BR opportunity or not. The bitmap size is the number of BR opportunities in a frame, and the bitmap is encoded in ascending order of the BR opportunity index.<br>0b0: No BR preamble sequence is detected,<br>0b1: At least one preamble sequence is detected<br>N_BR_Opportunities ≤ 4 |
|   MSB of resource start offset | 2 | 0b00, 0b01, 0b10: 2-bit-MSB of the start offset of the resource allocation (LRU)<br>0b11: No grant exist in this BRACK A-MAP IE. |
|   If(MSB of resource start offset != 0b11){ | | |
|     LSB of resource start offset | 5 | This field is the LSB of the start offset of the Resource allocation (LRU) for BR Header |
|     HFA start offset | 6 | This field is start offset of HARQ Feedback Allocation. |
|     Allocation size | 1 | Resource size for each BR header<br>0b0: 1 LRU<br>0b1: 2 LRUs |
|     Long TTI Indicator | 1 | Indicates number of AAI subframes spanned by the allocated resource for BR header.<br>0b0: 1 AAI subframe (default)<br>0b1: 4 UL AAI subframes for FDD or all UL subframes for TDD<br>If number of DL AAI subframes, D, is less than number of UL AAI subframes, U, Long TTI Indicator = 0b1 |
|   } | | |
|   for(i=0;i<N_BR_Opportunities;i++){ | | |
|     If(BR-ACK Bitmap[i]==1){ | | |
|       Number of received preamble sequences (L) | 2 | The number of BR preamble sequence indices included in this ACK A-MAP IE. |
|       for(j=0;j<L;j++){ | | |
|         Preamble sequence index | 5 | Preamble sequence index 5 Preamble sequence index received in the BR opportunity |
|         MSG decoding indicator | 1 | To indicate the decoding status of quick access message<br>0b0: MSG not decoded<br>0b1: MSG decoded relevant to Preamble sequence index |
|         if(MSB of resource start offset!=0b11)&&(MSG decoding indicator==0b0){ | | |
|           Grant indicator | 1 | To indicate whether grant of BR Header for the BR preamble sequence index is included or not<br>0b0: No UL resource allocation<br>0b1: UL resource allocation for BR with STID header |
|         } | | |
|       } | | |
|     } | | |
|   } | | |
|   reserved | variable | To reach 40-bit assignment A-MAP IE size. |
| } | | |

Referring to Table 2, the BR-ACK A-MAP IE indicates a decoding status of each BR opportunity in the n-th frame. Each BR-ACK A-MAP IE contains its own BR-ACK bitmap of size equal to the number of BR opportunities in the n-th frame. The BR preamble sequence indices in BR opportunities acknowledged in each BR-ACK A-MAP IE shall be mutual exclusive. Further, the BR-ACK A-MAP IE indicates Further, referring to Table 2, the BR-ACK A-MAP IE includes the allocation information for the fixed sized BR header. The UL resource and HARQ feedback allocation (HFA) shall be allocated to the preamble sequence whose grant indicator is '1'. The allocations shall be ordered based on the index of BR preamble sequences arranged in an ascending order. If the BR preamble sequence has the grant indicator of '1' in the k-th (k=0, 1, . . . , K−1) place within a BR ACK A-MAP IE, the starting logical resource unit (LRU) index, $R_k$, is calculated as $R_k=R0+k\times M$, where $R_0$ is the value of resource start offset, and M is the value of allocation size. K is the total number of BR preamble sequences whose grant indicator is '1' within a BR-ACK A-MAP IE.

maximum number of the HARQ retransmissions is set to the default value. Further, if resource for the BR header is allocated through the CDMA allocation A-MAP IE, non-adaptive HARQ retransmission is used. Table 3 shows an example of the CDMA allocation A-MAP IE.

TABLE 3

| Field | Size (bits) | Notes |
|---|---|---|
| CDMA_Allocation_A-MAP_IE( ){ | | |
|     A-MAP IE Type | 4 | CDMA Allocation A-MAP IE |
|     CDMA allocation indication | 1 | 0b0: Bandwidth allocation in response to a received contention-based bandwidth request. 0b1: Bandwidth allocation in response to a received contention-based ranging request |
|     If(CDMA allocation indication==0b0) { | | |
|         Resource Index | 11 | 512 FFT size: 0 in 2 MSB bits + 9 bits for resource index<br>1024 FFT size: 11 bits for resource index<br>2048 FFT size: 11 bits for resource index<br>Resource index includes location and allocation size. |
|         Long TTI indicator | 1 | Indicates number of AAI subframes spanned by the allocated resource.<br>0b0: 1 AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
|         HFA | 3 | HARQ Feedback Allocation |
|         Reserved | 20 | Reserved bits |
|     } | | |
|     Else if(CDMA allocation indication==0b1){ | | |
|         Uplink/Downlink Indicator | 1 | Indicates whether the following fields are for resource assignment in the uplink or in the downlink.<br>0b0: Uplink<br>0b1: Downlink |
|         Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size. |
|         $I_{SizeOffset}$ | 5 | Offset used to compute burst size index |
|         HFA | 3 | HARQ Feedback Allocation |
|         IF(Uplink/Downlink Indicator==0b0){ | | |
|             iotFP | 7 | Used for AMS resource assignment |
|             offsetControl | 6 | Transmit power adjustment value transmitted by the ABS. |
|             AI_SN | 1 | HARQ identifier sequence number |
|             Long TTI Indicator | 1 | Indicates the number of AAI subframes spanned by the allocated resource.<br>0b0: 1 AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
|         } Else{ | | |
|             ACID | 4 | HARQ channel identifier |
|             AI_SN | 1 | HARQ identifier sequence number |
|             SPID | 2 | HARQ subpacket identifier for HARQ IR |
|             Reserved | 8 | Reserved bits |
|         } | | |
|     } | | |
| } | | |

Meanwhile, if UL resource for the BR header is not allocated through the BR-ACK A-MAP IE, CDMA allocation A-MAP IE is used for the UL resource allocation. For the UL HARQ burst allocated through the BR-ACK A-MAP IE, the Referring to Table 3, the UL resource may be allocated to the UE that requests the bandwidth by using the BR preamble through the CDMA allocation A-MAP IE. That is, the BS may grant a UL bandwidth for transmission of a BR with an STID header during the bandwidth request process. Further, as described above, for the CDMA allocation A-MAP IE for the bandwidth request, non-adaptive HARQ retransmission may be used. On the contrary, for the CDMA allocation A-MAP IE for a ranging request, adaptive HARQ retransmission may be used.

Referring back to FIG. 4, in step S52, the UE performs scheduled UL transmission.

During the 3-step BR process, if the BS is unable to decode the quick access message, the BS falls back to the 5-step BR process. The 5-step BR process may be standalone performed or performed as an alternative BR process against a case in which the 3-step BR process of FIG. 4 fails.

Figure 5:
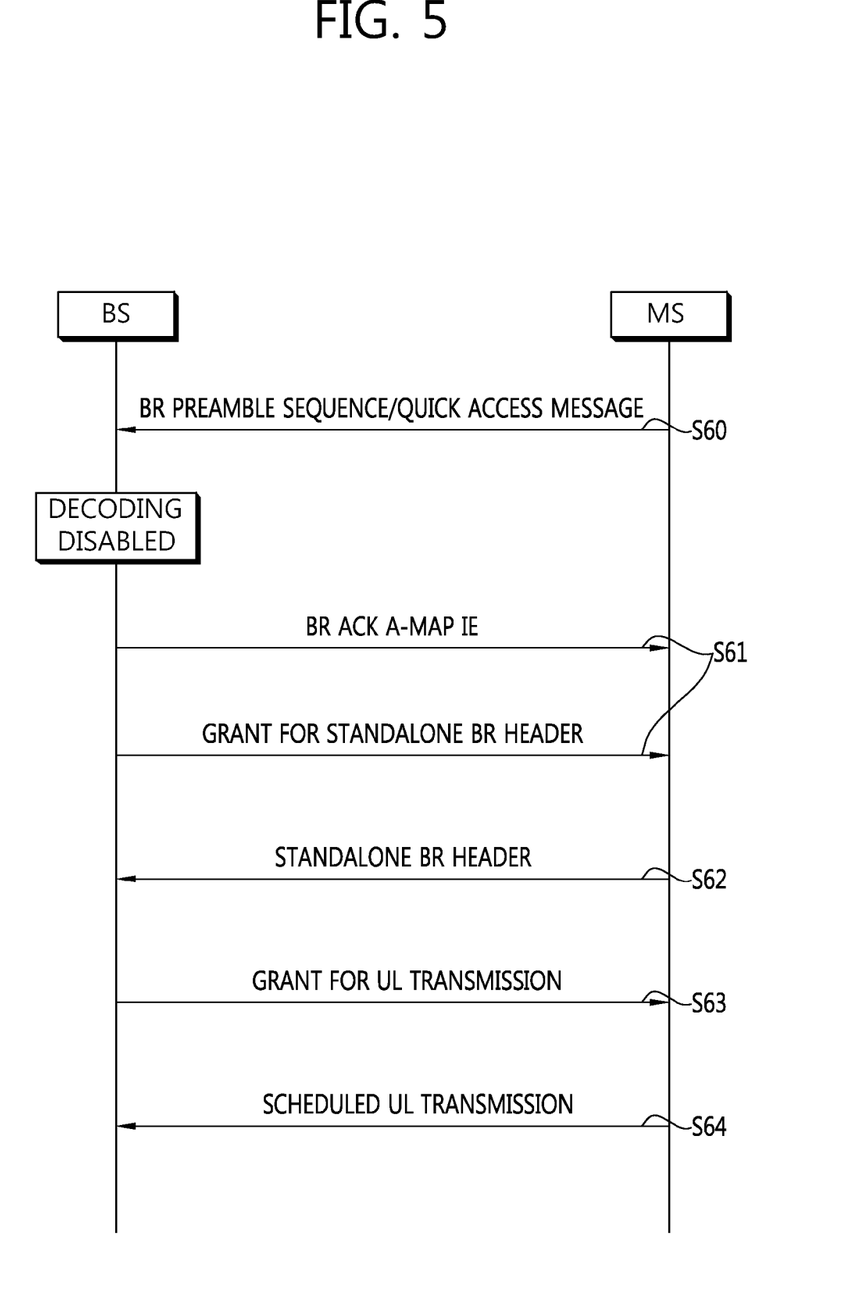
FIG. 5 shows an example of a 5-step BR process.

FIG. 5 shows an example of a 5-step BR process.

In step S60, the UE transmits the BR preamble sequence to the BS. In this case, the quick access message may be additionally transmitted.

If the BS is unable to decode the quick access message, the BS shall provide an UL grant to the UE using a BR ACK A-MAP IE or CDMA allocation A-MAP IE in step S61. The UL grant may be a grant for a standalone BR header. The maximum HARQ retransmission of the allocation mode through the BR-ACK A-MAP IE or CDMA allocation A-MAP IE is set as to the default value.

In step S62, the UE transmits a standalone BR header only to the BS.

The UE shall start the BR timer after sending BR header to the BS. The BR timer value shall be set to the differentiated BR timer acquired during the DSx transaction. The UE shall stop the BR timer upon reception of the UL grant. The UE may restart the BR process if BR timer is expired.

In step S63, the BS transmits the grant for the UL transmission to the UE.

In step S64, the UE performs scheduled UL transmission.

For the non-adaptive HARQ retransmission, a UL scheduler needs to reserve some UL resource according to the maximum number of UL retransmissions for the non-adaptive HARQ retransmission. Further, in the UL transmission, a UL persistent allocation may have already reserve UL resource until a persistent allocation of the UL resource is ended. Accordingly, when the non-adaptive HARQ retransmission is used for transmission of the BR header, a large burden may be on the UL scheduler. Therefore, the adaptive HARQ retransmission needs to be supported for transmission of the BR header.

Figure 6:
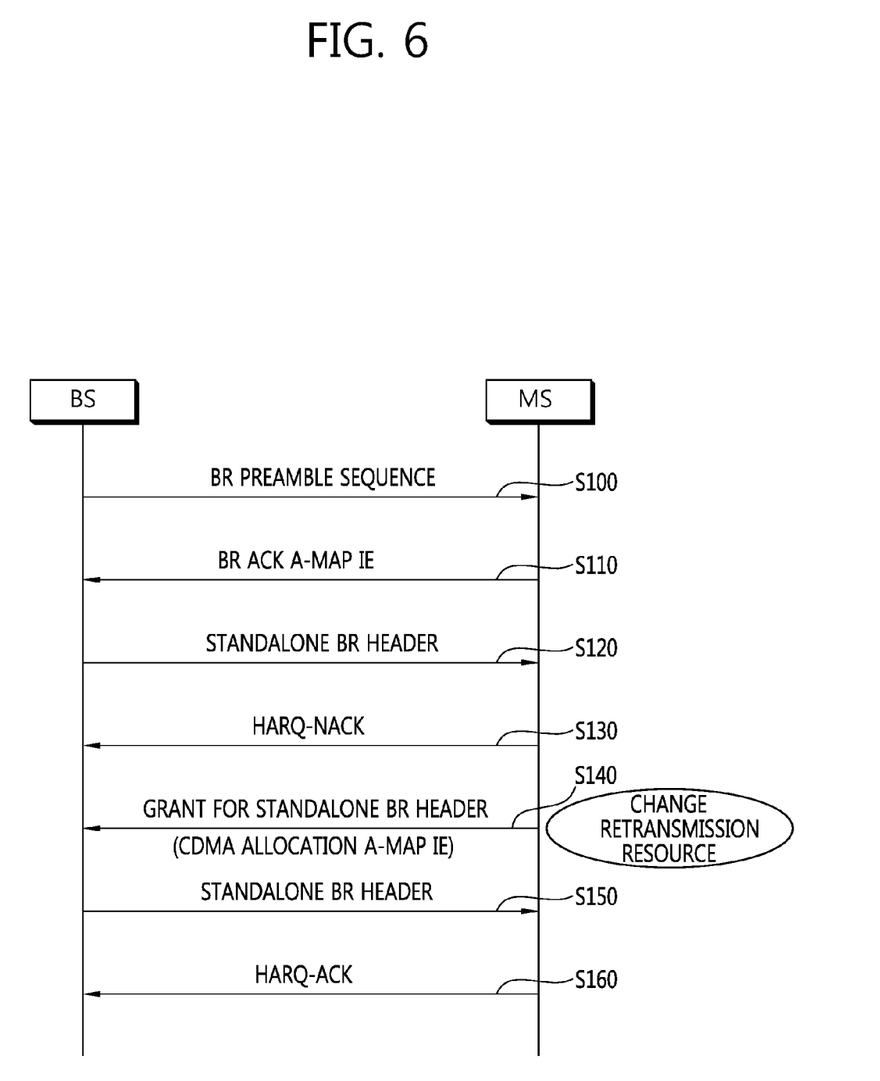
FIG. 6 shows an example of a method for allocating resources according to an embodiment of the present invention.

FIG. 6 shows an example of a method for allocating resources according to an embodiment of the present invention.

In step S100, the UE transmits the BR preamble sequence to the BS and in step S110, the BS transmits the BR-ACK A-MAP IE for the received BR preamble sequence to the UE. The UL resource for the UE to transmit the BR header may be allocated by the BR-ACK A-MAP IE.

In step S120, the UE transmits a standalone BR header to the BS based on the UL resource allocated through the BR-ACK A-MAP IE. In step S130, the BS transmits to the UE an HARQ-NACK indicating that the BS does not successfully receive the standalone BR header.

In step S150, the BS transmits a grant for the standalone BR header to the UE. In this case, the grant for the standalone BR header may be the CDMA allocation A-MAP IE. A resource for retransmitting the standalone BR header of the UE may be changed by the CDMA allocation A-MAP IE. As a result, the adaptive HARQ retransmission may be used for transmission of the BR header.

In step S160, the UE retransmits the standalone BR header to the BS based on the UL resource allocated through the CDMA allocation A-MAP IE. When the UE that is allocated with the UL resource for transmission of the BR header through the BR-ACK A-MAP IE receives the CDMA allocation A-MAP IE masked by a random access identifier (RAID) thereof, the UE may transmit the standalone BR header based on not the resource allocated through the BR-ACK A-MAP IE but the resource allocated through the CDMA allocation A-MAP IE. In this case, the CDMA allocation A-MAP IE may be the same as Table 3.

In step S170, the BS transmits to the UE an HARQ-ACK indicating that the base station successfully receives the standalone BR header.

Figure 7:
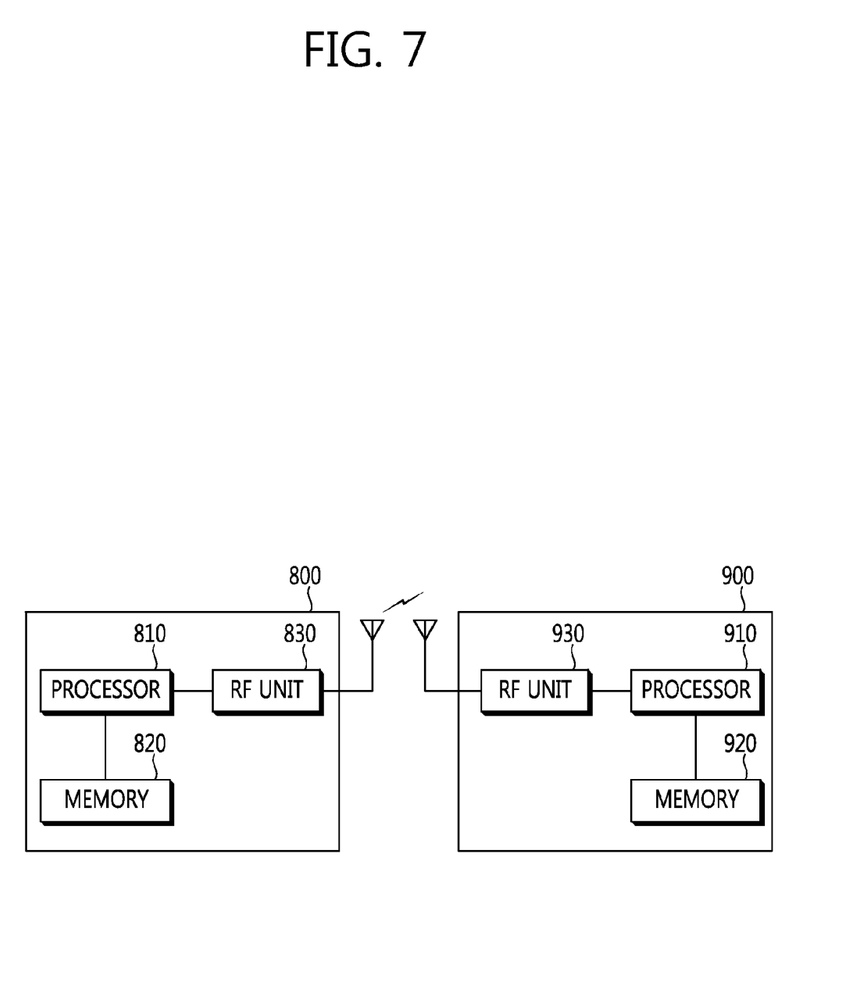
FIG. 7 is a block diagram showing wireless communication system to implement an embodiment of the present invention.

FIG. 7 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), a bandwidth request (BR) header in a wireless communication system, the method comprising:
   transmitting a BR preamble sequence to the base station on a $n^{th}$ frame;
   receiving a BR-acknowledgement (ACK) A-MAP information element (IE) corresponding to the BR preamble sequence on a n+BR_ACK_Offset frame;
   transmitting a standalone BR header to a base station through a first uplink (UL) resource allocated through a BR-ACK A-MAP IE;
   receiving from the base station a hybrid automatic repeat request (HARQ)-non-acknowledgement (NACK) that indicates that the standalone BR header is not successfully received by the base station;
   receiving a code division multiple access (CDMA) allocation A-MAP IE from the base station; and
   retransmitting the standalone BR header to the base station through a second UL resource allocated through the CDMA allocation A-MAP IE,
   wherein the BR_ACK_Offset is a time offset to respond to the BR preamble sequence,
   wherein the BR-ACK A-MAP IE includes a BR-ACK bitmap field and resource allocation fields,
   wherein the BR-ACK bitmap field includes a bitmap indicating at least one decoded BR preamble sequence among a plurality of BR preamble sequences corresponding to a plurality of BR chances received on the $n^{th}$ frame,
   wherein the resource allocation fields include information for an allocated resource for each at least one uplink resource allocated BR preamble sequence among the at least one decoded BR preamble sequence,
   wherein the first uplink resource is determined based on the BR-ACK bitmap field and the resource allocation fields.

2. The method of claim 1, wherein the CDMA allocation A-MAP IE is masked by a random access identifier (RAID) of the UE.

3. The method of claim 1, wherein the CDMA allocation A-MAP IE includes an index of the second UL resource.

4. The method of claim 1, wherein the CDMA allocation A-MAP IE includes the number of subframes occupied by the second UL resource.

5. The method of claim 1, further comprising:
   receiving from the base station an HARQ-ACK that indicates that the retransmitted standalone BR header is successfully received by the base station.

6. The method of claim 1, wherein the allocated resource for the each at least one uplink resource allocated BR preamble sequence is determined based on a resource start offset field, a resource allocation size field included in the resource allocation fields and each index number for the each at least one uplink resource allocated BR preamble sequence.

7. A user equipment (UE) for transmitting a bandwidth request (BR) header in a wireless communication system, the UE comprising:
   a radio frequency (RF) unit for transmitting or receiving a radio signal; and
   a processor connected with the RF unit, and configure to:
   transmit a BR preamble sequence to the base station on a $n^{th}$ frame;
   receive a BR-acknowledgement (ACK) A-MAP information element (IE) corresponding to the BR preamble sequence on a n+BR_ACK_Offset frame;
   transmit a standalone BR header to a base station through a first uplink (UL) resource allocated through a BR-ACK A-MAP IE;
   receive from the base station a hybrid automatic repeat request (HARQ)-non-acknowledgement (NACK) that indicates that the standalone BR header is not successfully received by the base station;
   receive a code division multiple access (CDMA) allocation A-MAP IE from the base station; and
   retransmit the standalone BR header to the base station through a second UL resource allocated through the CDMA allocation A-MAP IE,
   wherein the BR_ACK_Offset is a time offset to respond to the BR preamble sequence,
   wherein the BR-ACK A-MAP IE includes a BR-ACK bitmap field and resource allocation fields,
   wherein the BR-ACK bitmap field includes a bitmap indicating at least one decoded BR preamble sequence among a plurality of BR preamble sequences corresponding to a plurality of BR chances received on the $n^{th}$ frame,
   wherein the resource allocation fields include information for an allocated resource for each at least one uplink resource allocated BR preamble sequence among the at least one decoded BR preamble sequence,
   wherein the first uplink resource is determined based on the BR-ACK bitmap field and the resource allocation fields.

8. The UE of claim 7, wherein the CDMA allocation A-MAP IE is masked by a random access identifier (RAID) of the UE.

9. The UE of claim 7, wherein the CDMA allocation A-MAP IE includes an index of the second UL resource.

10. The UE of claim 7, wherein the CDMA allocation A-MAP IE includes the number of subframes occupied by the second UL resource.

11. The UE of claim 7, wherein the processor is further configured to: receive from the base station an HARQ-ACK that indicates that the retransmitted standalone BR header is successfully received by the base station.

12. The UE of claim 7, wherein the allocated resource for the each at least one uplink resource allocated BR preamble sequence is determined based on a resource start offset field, a resource allocation size field included in the resource allocation fields and each index number for the each at least one uplink resource allocated BR preamble sequence.

* * * * *